US009659584B2

(12) United States Patent
Liu

(10) Patent No.: US 9,659,584 B2
(45) Date of Patent: May 23, 2017

(54) DYNAMIC FLYING HEIGHT READ/WRITE HEAD WITH OFF-TRACK CONTACT CAPABILITY AT TOUCH DOWN IN HARD DISK DRIVES

(75) Inventor: Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 928 days.

(21) Appl. No.: 11/717,348

(22) Filed: Mar. 13, 2007

(65) Prior Publication Data
US 2008/0225427 A1    Sep. 18, 2008

(51) Int. Cl.
*G11B 5/40* (2006.01)
*G11B 5/455* (2006.01)
*G11B 5/60* (2006.01)
*G11B 5/31* (2006.01)
*G11B 5/127* (2006.01)

(52) U.S. Cl.
CPC .......... *G11B 5/3133* (2013.01); *G11B 5/1278* (2013.01); *G11B 5/607* (2013.01); *G11B 5/6064* (2013.01); *G11B 5/6076* (2013.01); *Y10T 428/11* (2015.01)

(58) Field of Classification Search
CPC ... G11B 5/3106; G11B 5/3136; G11B 5/3133; G11B 5/1278; G11B 5/6064; G11B 5/607; G11B 5/6076; Y10T 428/11
USPC .................. 360/125.74, 125.31, 235.4, 234.3
See application file for complete search history.

(56) References Cited

U.S. PATENT DOCUMENTS

| | | | |
|---|---|---|---|
| 5,959,801 A * | 9/1999 | Gillis et al. ...................... 360/75 |
| 6,690,543 B2 * | 2/2004 | Kurita et al. .............. 360/234.7 |
| 6,707,646 B2 | 3/2004 | Berger et al. | |
| 6,799,365 B2 * | 10/2004 | Boutaghou ................ 29/603.12 |
| 7,064,930 B2 * | 6/2006 | Serpe et al. .............. 360/236.5 |
| 7,068,468 B2 | 6/2006 | Kamijima | |
| 7,086,931 B2 | 8/2006 | Oyama et al. | |
| 7,095,587 B2 | 8/2006 | Kurita et al. | |
| 7,102,856 B2 | 9/2006 | Koide et al. | |
| 7,542,243 B2 * | 6/2009 | Lou et al. .................. 360/294.7 |
| 7,558,022 B2 * | 7/2009 | Kurita et al. .............. 360/234.4 |
| 7,701,676 B2 * | 4/2010 | Kubotera et al. .......... 360/294.7 |
| 7,729,088 B2 * | 6/2010 | Kurita et al. .............. 360/234.4 |
| 7,808,746 B2 * | 10/2010 | Burbank et al. ........... 360/294.3 |

(Continued)

FOREIGN PATENT DOCUMENTS

| | | |
|---|---|---|
| JP | 2004-234792 | 8/2004 |
| JP | 2005-332514 | 12/2005 |
| JP | 2006-323932 | 11/2006 |

OTHER PUBLICATIONS

Japanese Office Action 2008-064703 Mailed—Dec. 4, 2012.

*Primary Examiner* — Julie Anne Watko
(74) *Attorney, Agent, or Firm* — Saile Ackerman LLC; Stephen B. Ackerman

(57) ABSTRACT

Dynamic fly height (DFH) control is obtained for a read/write head by use of a heating element having two laterally separated heat sources symmetrically spaced around the track center line of the head. The two heating sources create a protrusion profile relative to the undistorted ABS that recesses the read element and main write pole at the track center line relative to off-track positions. The resulting DFH control also protects the head from HDI (head-disk interference) events that are either the result of calibration procedures or normal HDD (hard disk drive) operation.

7 Claims, 4 Drawing Sheets

(56) References Cited

U.S. PATENT DOCUMENTS

| | | | |
|---|---|---|---|
| 7,961,429 B2* | 6/2011 | Kurihara et al. | 360/125.31 |
| 7,974,046 B2* | 7/2011 | Ota et al. | 360/294.7 |
| 8,665,562 B2* | 3/2014 | Ma et al. | 360/125.31 |
| 8,717,714 B2* | 5/2014 | Otsuki | 360/294.7 |
| 8,724,263 B2* | 5/2014 | Hutchinson et al. | 360/125.74 |
| 2002/0191326 A1* | 12/2002 | Xu et al. | 360/75 |
| 2004/0257706 A1* | 12/2004 | Ota et al. | 360/234.5 |
| 2005/0213250 A1* | 9/2005 | Kurita et al. | 360/234.4 |
| 2006/0039077 A1* | 2/2006 | Xu et al. | 360/75 |
| 2007/0247739 A1* | 10/2007 | Iida | 360/75 |
| 2007/0247758 A1* | 10/2007 | Kurita et al. | 360/234.7 |
| 2008/0019041 A1* | 1/2008 | Aoki | 360/110 |
| 2008/0253021 A1* | 10/2008 | Pust et al. | 360/122 |
| 2009/0257143 A1* | 10/2009 | Hachisuka | 360/75 |

* cited by examiner

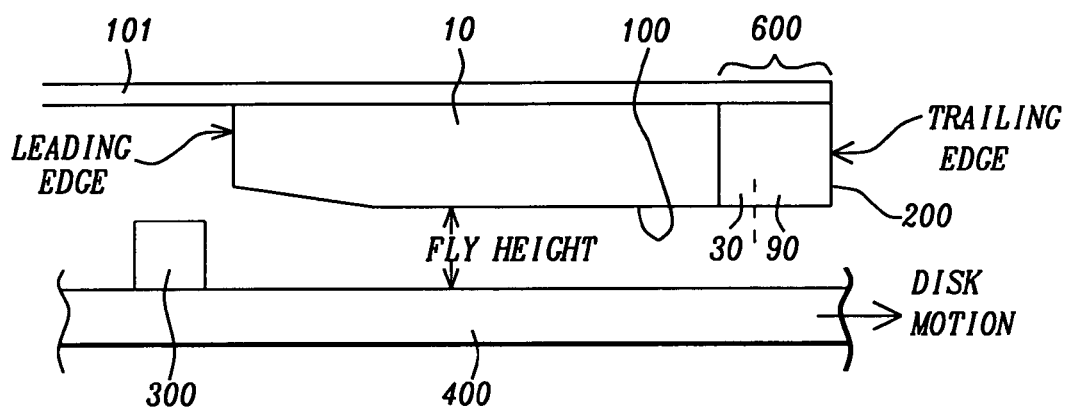
FIG. 1 – Prior Art
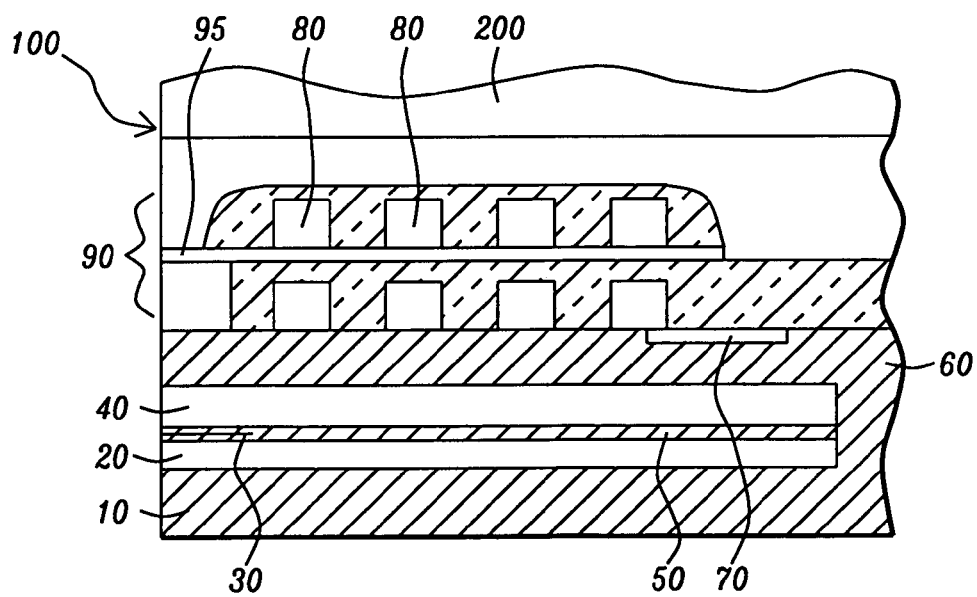
FIG. 2 – Prior Art

DYNAMIC FLYING HEIGHT READ/WRITE HEAD WITH OFF-TRACK CONTACT CAPABILITY AT TOUCH DOWN IN HARD DISK DRIVES

BACKGROUND OF THE INVENTION

1. Field of the Invention

This invention relates to the fabrication of hard disk drives (HDD), particularly to a method of controlling slider fly height by use of heater elements to increase head protrusion at the air bearing surface (ABS).

2. Description of the Related Art

As magnetic read/write heads have been required to deal with magnetic media having increasingly higher area density of their recorded information, various methods have been developed to improve the capabilities of the head to read and write at those levels. Traditionally, the direction taken in trying to achieve the reading and writing of this high density information has been to decrease the spacing (i.e. the static fly height) between the disk and the slider in each new generation of products. FIG. 1 is a schematic illustration showing a suspension-mounted slider (collectively termed a "head gimbals assembly (HGA)") positioned above a rotating magnetic hard disk during disk-drive operation at ambient operating temperature. The suspension (101) holds the slider (10) at an angle above the surface of the spindle-mounted (300) magnetic disk (400), producing a magnetic spacing between the air bearing surface (ABS) (100) of the slider and the disk. The rotation of the disk is, by definition, into the leading edge of the slider, while the read/write head (600) is located at the trailing edge of the slider. The write portion of the head (90) is above (more to the trailing edge) the read portion (30). The hydrodynamics of the air layer between the ABS and the disk surface supports the slider at a static fly height above the disk.

However, the limit of the total clearance budget prohibits a continuous reduction of this static fly height. In addition to the static fly height variations from the ABS and HGA/HSA (head gimbal assembly/head stack assembly) manufacturing processes, other factors also contribute to the total clearance between the head and the disk. A simple example is the drop in static fly height when the HDD is moved from sea level to a higher altitude. Yet another example is the isothermal PTP (pole tip protrusion) associated with the change in ambient temperature of the environment in which the HDD is located. In this regard, Berger et al. (U.S. Pat. No. 6,707,646) discloses the deposition of a magnetoeleastic layer on the HDD suspension arm to increase or decrease fly height when the ambient temperature is increased. Furthermore, the writer coil induced PTP (protrusion caused by joule heating of the coil) also diminishes the fly height clearance when the coil is activated to produce magnetic flux in a HDD write operation. There is a clear necessity to have a method of producing DFH (dynamic fly height) control, i.e. a method of providing a controllable head-disk spacing under various operational conditions, to avoid incidental contacts between the head and the disk that result from these inevitable variations in static fly height.

A common prior art approach to introducing such a "dynamic" control of fly height spacing is to embed a thin layer of heater film inside the magnetic recording head. The heater film is electrically connected to the pre-amplifier within which a heater current is activated to increase the heater film temperature and, thereby, to increase the temperature of the surrounding materials of the head structure. When subjected to this increased temperature, the materials forming the head begin to expand in accordance with their respective thermal expansion characteristics. This leads to a thermally deformable ABS that achieves a lower spacing between the disk surface and the RG (read gap) and WG (write gap), thus greatly improving head performance.

When the read/write operation is not required, the heater current is turned off so that the ABS is elastically returned to its original, non-deformed state. The induced rise in temperature produced by the heating is sufficiently mild that the reliability of the head is not detrimentally affected. In addition, the heater activation has not shown a degrading effect on the magnetic reader in terms of noise and stability since the magnetic fields produced by the heater activation currents is minimal.

The prior art discloses several approaches to DFH that utilize heater elements formed within the head. Kurita et al. (U.S. Pat. No. 7,095,587) teaches a thin film heating element formed within the alumina overcoat layer. Oyama et al. (U.S. Pat. No. 7,086,931) shows a heater formed on each thin film magnetic head wherein the heaters are connected in series and a resistor is connected between each heater. Kamijima (U.S. Pat. No. 7,068,468) describes an upper and lower heat source and flexible layers located opposite the head ABS with respect to the write head. Koide et al. (U.S. Pat. No. 7,102,856) addresses the problem of conductively connecting the heater to external circuitry and discloses a pair of heater electrode pads positioned outside the recording and reproducing pads.

The utilization of the DFH heater shows an unequivocal improvement in HDD performance. However, the same DFH power setting cannot be expected to deliver the same changes in spacing for each individual head due to the inevitable variations in the manufacturing process. Obtaining precise tuning of spacing on an individual head-to-head basis requires an off-line calibration procedure to map out each head's DFH operation range from touchdown to zero power. The brief touchdown between the head and media has to be designed to carefully prevent any hazardous HDI (head disk interference) that may cause severe performance degradation and possible reliability failure of the HDD.

In addition to the touchdown related HDI hazard during calibration with the existing DFH design, the potential for HDI during HDD operation when the heater is activated is also troublesome. The goal of existing DFH design is to enable maximum actuation efficiency for the RG and WG. This actuation efficiency is defined by RG or WG protrusion per unit of heater power in nanometers per milliwatts (nm/mW). The placement of the DFH in a vertical direction, i.e. the direction from leading edge to trailing edge in the mounting of the head in the slider, within the structure of the head is also critical in achieving minimal point (MIN) clearance of the RG/WG to the disk. The MIN being defined at the point on the ABS in front of the heater at the overcoat.

A prior art DFH location within the overcoat alumina (aluminum oxide) was proven to have unacceptable RG-to-MIN clearance. In this prior art structure, the actuation efficiency at the minimal clearance point is too high compared to the RG actuation efficiency. The touchdown onto the disk is, therefore, premature because the RG spacing to the disk has hardly changed, resulting in unusable DFH during HDD operation.

Referring to FIG. 2, there is shown a schematic cross-section of a read/write head indicating an approximate placement position for a heater element. This placement is used to demonstrate the differences between the effects of a single source prior art heating element and the symmetrically positioned double source heater element of the present invention. In FIG. 2, proceeding in the vertical direction (which is not the direction of head fabrication), from leading to trailing edge of the head, there can be seen a slider substrate (10), a lower read shield (20), a read head (30), typically a giant magnetoresistive (GMR) or tunneling magnetoresistive (TMR) read head that includes a read gap (RG) that is not specifically shown, the head being formed over the lower read shield, an upper read shield (40) formed in a horizontal plane over the read head, a layer of insulation (50) separating the two read shields, a further layer of insulation (60) formed over the upper read shield, a DFH heater element (70) formed over the upper read shield and embedded within the layer of insulation (60), a double layer of coils (80), shown in square cross-section, that serve to inductively activate the magnetic write head and a magnetic pole structure (90) typical of a perpendicular magnetic recording (PMR) type write head (for exemplary purposes only). The pole structure includes a write gap (WG) layer (95). The ABS plane is indicated as (100), and a slider substrate is indicated as (10). An overcoat layer (200) typically covers the trailing edge of the head. It is understood that the ABS (100) is coated with a protective hard diamond-like coating (DLC), but this is not shown. The existing placement of the DFH heater (70) above the upper read shield (40) works well in delivering good RG (30) actuation ("actuation" denoting the effects of heat-produced variations in height relative to an undistorted ABS that occur when the heating element is activated) while still causing greater protrusion of WG (which is closer to the trailing edge) than RG. The shape of these heat-produced height variations along a given linear direction, called an actuation profile (shown in FIG. 6a and FIG. 6b and discussed below), accomplishes the result that the greater protrusion of the WG effectively provides a recessed region for the RG, so that the RG is further away from a HDI hazard during DFH operation. However, the higher actuation of the WG and WS (write shield) now causes them to become the minimal clearance point that will make the initial contact with the disk when an HDI occurs, either during off-line touchdown calibration or incidental bumping during actual HDD operation. A simulation of the DFH actuation profile in the cross-track direction shows a sharp protrusion of the WG and WS right at the track center (see FIG. 4 for these protrusions in a single element prior art heater). The excessive wear caused by DFH overdrive (excessive reduction of head-to-disk clearance) during touchdown calibration as evidenced by (for example) algorithms simulating acoustic emissions and write faults, would cause the DLC (diamond-like carbon) overcoat to be worn off, exposing the underlying magnetic material to the environment without any protection. The lingering reliability concern that magnetic material corrosion can lead to HDD write failure calls for an improved DFH design to resolve the issue. It is the purpose of the present invention to provide such a design.

SUMMARY OF THE INVENTION

The first object of the present invention is to provide dynamic fly height (DFH) control of a read/write head during hard disk drive (HDD) operation.

The second object of the present invention is to provide such DFH control by means of controlling the shape of the read/write head ABS.

The third object of the present invention is to provide such a method that allows improved detection capability of both calibration and operational touchdown events and, further, wherein the read/write head has increased roll stability during said touchdown events.

A fourth object of the present invention is to provide such control wherein ABS surface stresses encountered during contact events are reduced.

A fifth object of the present invention is to provide such control wherein on-track efficiency of both reader and writer elements is enhanced.

A sixth object of the present invention is to provide such control whereby there is simultaneously produced an off-track contact capability for shielding the read and write elements during calibration and operational touchdown events.

The objects of this invention will be achieved by formation of a heat producing element within a read/write head wherein the element design incorporates two symmetric, off-track heat sources symmetrically disposed (relative to the track center line) along the cross-track direction. The design creates two symmetrically opposed (across the track center line) regions of heat concentration that produce greater off-track protrusion of the read and write elements relative to the ABS. This results in a wider region of maximum protrusion and, in turn, reduces the contact stress experienced at the MP (main pole), WG and RG at the track center as compared to a point contact typical of the prior art designs. The wider contact area also improves the signal for detection of a touchdown, which tends to reduce the tendency to overdrive the DFH, which creates even more severe HDI events. The center track actuation efficiency for RG and WG can still be maintained/improved with the optimization of the heat source distance, heater layout footprint and heater distance to the ABS. The effects of the two symmetric heater sources can also enhance the roll stability when an actual touchdown occurs because of the protrusion profile in the cross-track direction.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic side view of a prior art suspension mounted slider showing the magnetic spacing between the slider and a disk surface during normal operating temperatures.

FIG. 2 is a schematic diagram showing the placement of a prior art type single heat source over an upper read shield. The present heater element is similarly positioned.

DESCRIPTION OF THE PREFERRED EMBODIMENTS

The preferred embodiment of the present invention teaches a method of providing DFH control for a magnetic read/write head by utilizing a heater element design that provides two symmetrically disposed, off-track heat sources that are symmetrically positioned relative to the track center in a direction that is substantially perpendicular to a track center line.

Figure 3A:
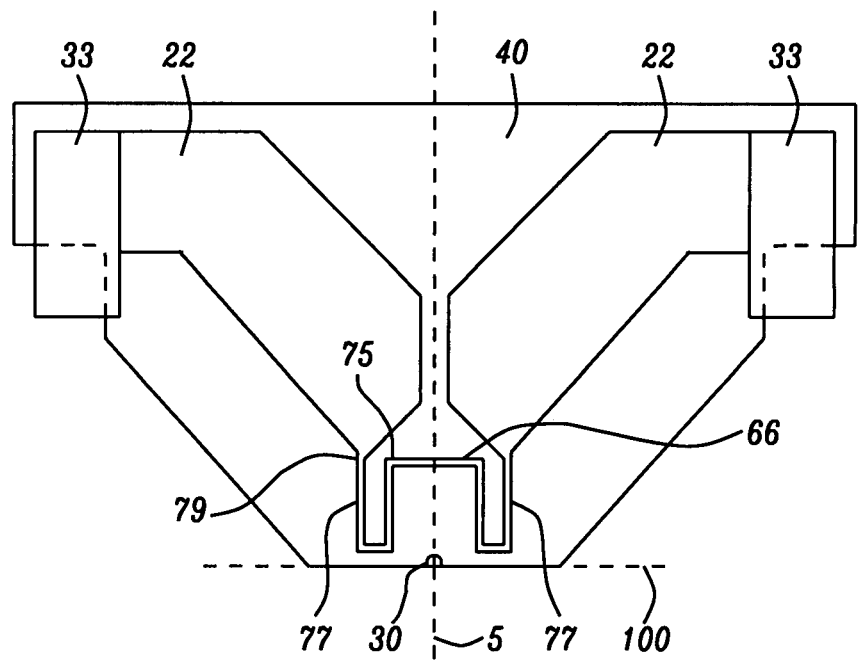
FIGS. 3a and 3b are two schematic illustrations of the present heater design, the designs differing in the space between the two heat sources, with FIG. 3b showing the wider spacing.

Referring to FIG. 3a, there is shown an overhead view (in a horizontal cross-section) of one example of the two source heater element of the present invention. A vertical dashed line (5) schematically indicates the track center line about which the two laterally separated sources (77) are symmetrically placed along a substantially perpendicular direction to the track center line. A horizontal dashed line indicates the ABS plane (100). The two sources (77) extend substantially towards the ABS plane and, by their extension, partially surround the read head element (30) which is below the sources and not in contact with the sources. The heating element is formed in a substantially horizontal plane over the upper read shield (40) of the head and is ultimately embedded within an insulating layer within the read/write head (shown as (60) in FIG. 2)) over which the inductive write coils of the write head are formed. FIG. 2 shows the arrangement more clearly in a vertical cross-section.

Electrically conducting layers (22) are symmetrically disposed over the shield and terminate in connecting tabs (33) that would allow connections to the current source of the pre-amplifier (not shown). These layers, when connected to the current source, provide the current to activate the heater element.

Figure 3B:
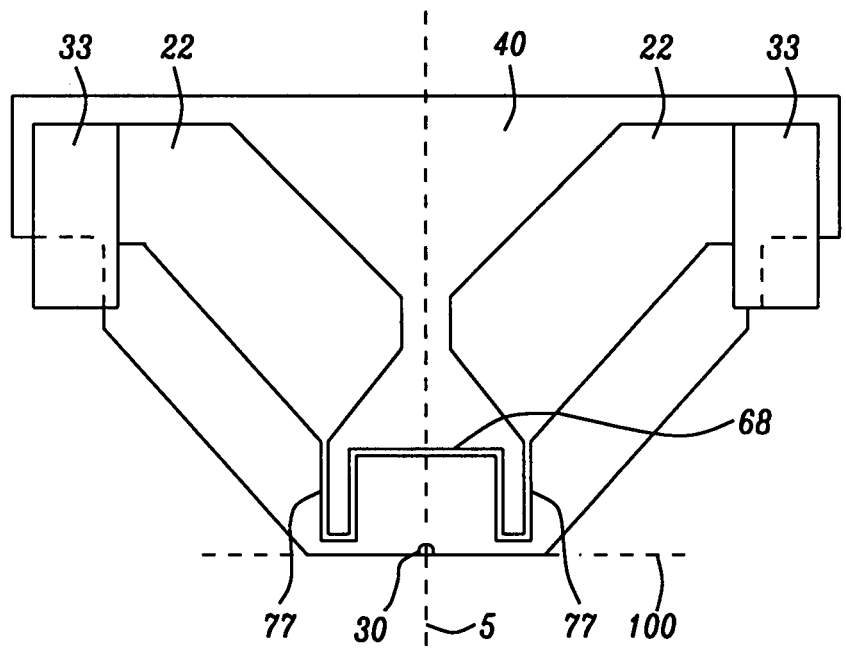
Figure 4:
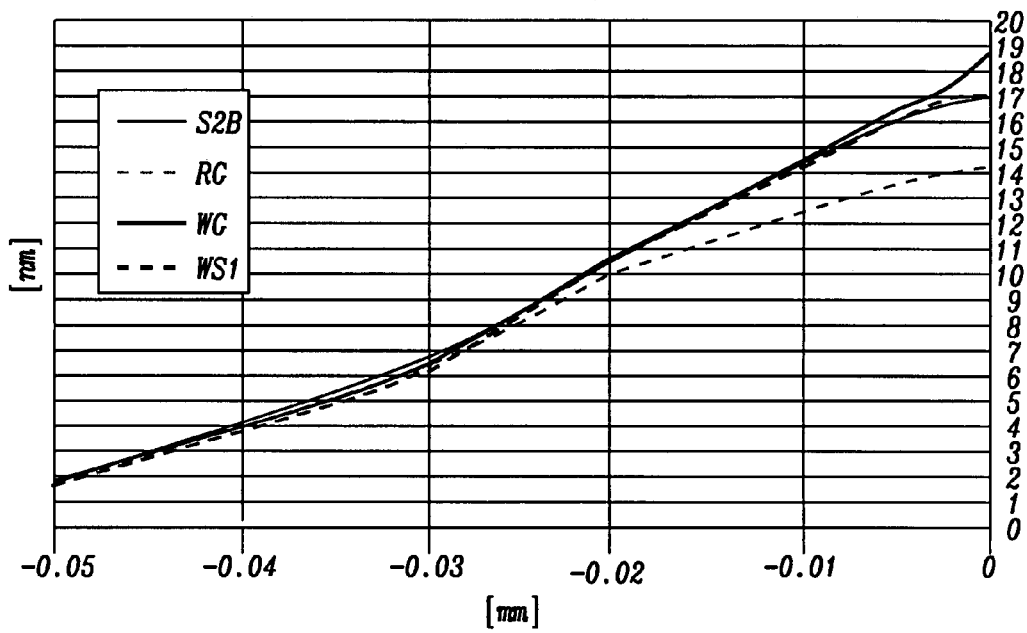
FIG. 4 is a graphical illustration of the cross-track actuation profile (protrusion distance profile) for a prior art single heater DFH (located as in FIG. 2), as would be measured at the read shield (S2B), the read gap (RG), the write gap (WG) and the write shield (WS) of the read/write element

The two identical, laterally separated and symmetrically disposed heat sources (77) are formed of material having a high resistivity and high coefficient of thermal expansion (for maximum protrusion of head elements at the ABS plane) and are electrically connected at each of the pair of corresponding ends (75) by a low resistivity element (66) whose length provides the necessary lateral separation and spacing between the sources. The other pair of ends of the heating sources are connected (79) to the conducting layers (22). Although the read head cannot be seen from this view because it is below the shield (40), it is schematically indicated (30) to provide an indication of its location relative to the heat sources. The write head pole tip is above the heater element and is not seen. Note that FIG. 3b is identical in all respects to FIG. 3a except that the two heat sources (77) are laterally separated by a greater distance by using a longer conducting element (68). In general, the heating sources will not be separated by more than approximately 100 microns, to fit within the typical width of the upper shield.

A finite element simulation provides an accurate indication of the performance of the heater element under operating conditions of the HDD. In the present simulated embodiment the DFH design uses heater sources that are separated by approximately 15 microns (see (66) in FIG. 3a). The write element is designed as a PMR (perpendicular magnetic recording) head with a double coil layer, although this is for exemplary purposes only. The materials and layer dimensions of the model are representative of the industry. The simulated touchdown condition of the model head is met when the simulated DHF power is sufficient to have any part of the head ABS reaching the static flying height limit, assuming a perfectly smooth disk surface. The simulation results are shown at a steady-state condition when thermal and magnetic equilibrium are reached.

Figure 5:
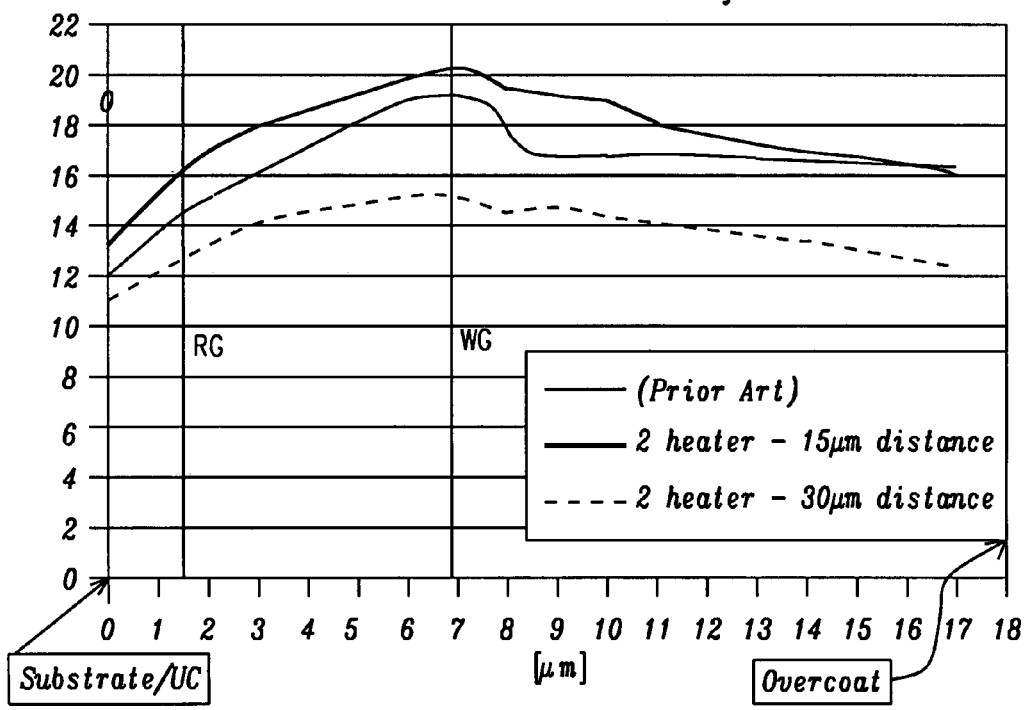
FIG. 5 is a graphical representation of the actuation profile of a read/write head furnished with a single prior art heating element and with each of two examples of the two element heater of the present invention. The actuation profile is generated by a simulation and passes along the track center. The position of the read gap (RG) and write gap (WG) are indicated on the graph.

Referring to FIG. 5 there is shown the track center DFH actuation profiles for a simulated 100 mW heater activation and two separation distances between the two heater elements, 15 microns and 30 microns. Also shown for comparison purposes is the actuation profile for a single source prior art type heater element. The profile is taken from the head substrate, the abscissa origin, to the head overcoat, 18 microns on the abscissa. The ordinate, calibrated in nanometers (nm), measures protrusion.

As can be seen in the graphic representation, both of the present invention two heat source elements show greater actuation efficiency at both the WG and RG than the prior art element, with the 15 micron separated element showing greater efficiency than the 30 micron separated element. The general shape of the profile is quite similar for both elements of the present invention, showing that there is less protrusion in the RG region than the WG region, indicating protection of the sensitive read element and, thereby, robust reliability. Further, because the greater protrusion at the WG position is not sufficient to cause the RG to recede too much from the minimal clearance point, better performance associated with a smaller RG spacing at HDD operation is assured.

Figure 6A:
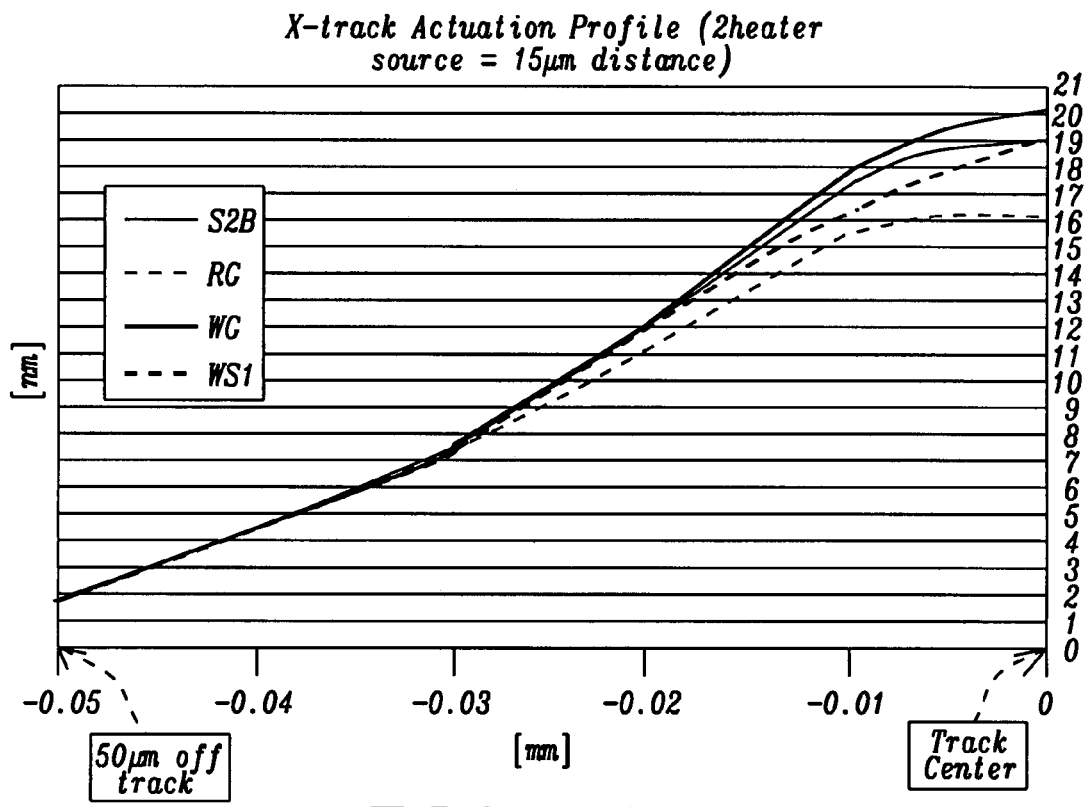
FIGS. 6a and 6b are simulated cross-track actuation profiles for the two heater source of the present invention at two separation distances of the heater sources (15 microns in 6a and 30 microns in 6b). The profiles are generated at the positions of the top shield (S2B), the read gap (RG), the write gap (WG) and the write shield (WS1).
Figure 6B:
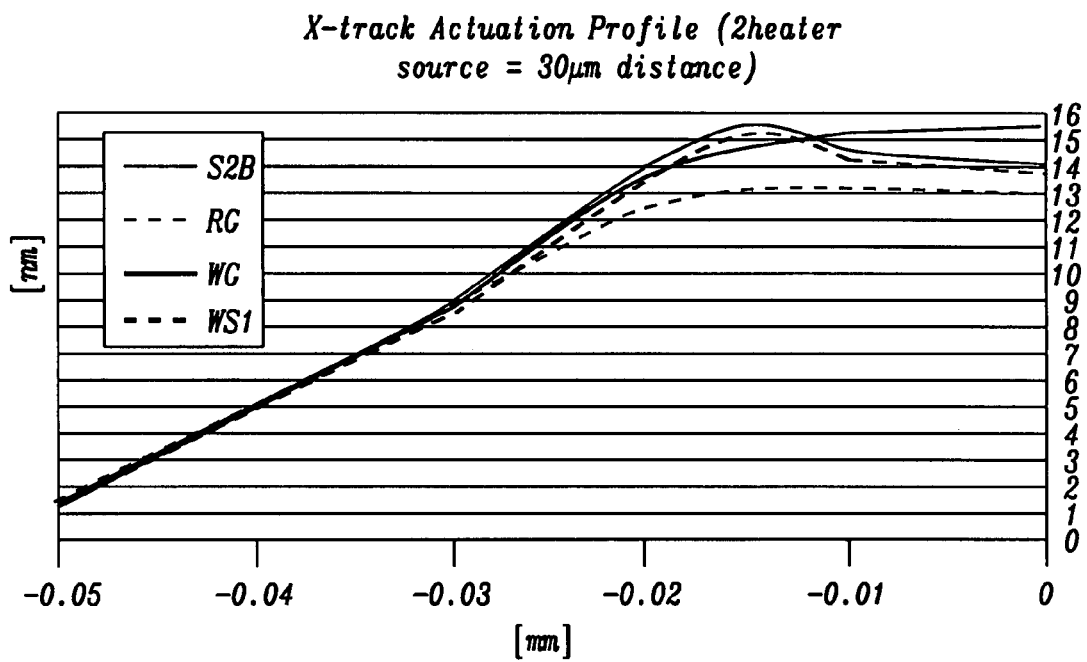

Referring next to FIGS. 6a and 6b, there are shown the cross-track actuation profiles for each of the two elements of the present invention, the element with 15 micron spacing in FIG. 5a and that with 30 micron spacing in FIG. 5b. In each of the two graphic representations, the actuation profile is generated across four positions, the upper read shield, (denoted on the graph as S2B) the read gap (RG), the write gap (WG) and the write shield (denoted WS1). The graph ordinates indicate the off track range, from 50 microns off track (−0.05 on the ordinate) to the track center. The ordinate indicates protrusion in nanometers.

Both FIG. 6a and FIG. 6b show the appearance of a plateau as the curves bend towards the horizontal as the track center is approached. Indeed, in FIG. 5b the profile actually bends down below the horizontal, indicating that the center track position is recessed relative to the outer off-track positions. The plateau is also broader in FIG. 6b than in FIG. 6a. This is an indication that there is a wider contact area in case of touchdown during calibration and HDD operation, thus greatly reducing the contact stress at the track center's main pole (MP) area. Also, depending on the backend PTR profile, the 30 micron spaced heater element can provide outright off-track contact while still shielding the delicate reader and MP in a preferred recessed position. We can also conclude that further optimization of the separation distance between the two heat sources can improve the on-track activation efficiency and off-track contact capability so that both enhanced performance and improved HDI reliability can be achieved.

As is understood by a person skilled in the art, the preferred embodiment of the present invention is illustrative of the present invention rather than being limiting of the present invention. Revisions and modifications may be made to methods, processes, materials, structures, and dimensions through which is formed a DFH controlled read/write head using a two heat source heating element, while still providing such a read/write head, formed in accord with the present invention as defined by the appended claims.

What is claimed is:

1. A DFH (dynamic flying height) controlled read/write head comprising:
   a slider mounted read/write head wherein said read/write head comprises separate read and write elements that are displaced from each other in a down-track direction;
   a single, conductively continuous heater element formed about the read/write head, said single heater element including two heat sources formed of electrically conductive material having a first resistivity and a first coefficient of thermal expansion, and said two heat sources being connected by electrically conducting material having a second resistivity that is lower than said first resistivity and said heater element being formed within a substantially horizontal plane, said heat sources being laterally separated and symmetrically disposed to either side of said read/write head in a substantially perpendicular direction to a track center line through said read/write head and wherein said heat sources extend towards an ABS of said read/write head in a direction parallel to said track center line;
   electrical connections between said heater element and a source of current for activating said element, whereby activation of said heater elements by a single electrical current produces a thermally activated protrusion of said ABS having a shape profile in a cross-track direction; wherein, as a result of said separation of said two heater sources, said shape profile includes protrusions relative to said ABS that are greatest at positions laterally disposed to either side of said read/write head, whereby said shape profile both provides dynamic control of a flying height of said read/write head and, in the event of head disk interference (HDI), as indicated acoustically, algorithmically or by the ABS approaching a static flying height, creates a recess within which said read/write head is protected by said laterally surrounding, thermally produced projections of the ABS that rise above the level of said read/write head and to either side of said read/write head and protect said read/write head in the event of actual off-track contact between said ABS and a rotating hard disk; wherein
   a flat plateau formation between said projections insures a stress-free region at the track center main pole area; and wherein
   detection capability can be enhanced through simulation of additional operational and calibrational touchdown events because there is assured protection of said read/write head and, in addition, wherein roll stability is provided during actual touchdowns because of the protrusion shape profile in the cross-track direction.

2. The DFH controlled read/write head of claim 1 wherein an upper read shield is formed over said read element and wherein said heater element is formed on said upper read shield.

3. The DFH controlled read/write head of claim 2 wherein said heat sources are laterally separated by less than 100 microns, which is a width of said upper read shield.

4. The DFH controlled read/write head of claim 1 wherein said heat sources are laterally separated by 15 microns.

5. The DFH controlled read/write head of claim 1 wherein said heat sources are laterally separated by 30 microns.

6. The DFH controlled read/write head of claim 1 wherein said first resistivity and first coefficient of thermal expansion of said electrically conducting material of said heat sources is chosen to provide thermal protrusion of said ABS at a temperature above ambient.

7. The DFH controlled read/write head of claim 6 whereby said thermal protrusion is greatest at positions laterally and symmetrically displaced from said read element, thereby placing said read element in a recess and protecting said element from the roll destabilizing effects of HDI (head disk interference).

* * * * *